Nov. 20, 1934.  E. J. GRANT  1,981,231
REGISTERING STOP DEVICE
Filed Oct. 12, 1931   2 Sheets-Sheet 1
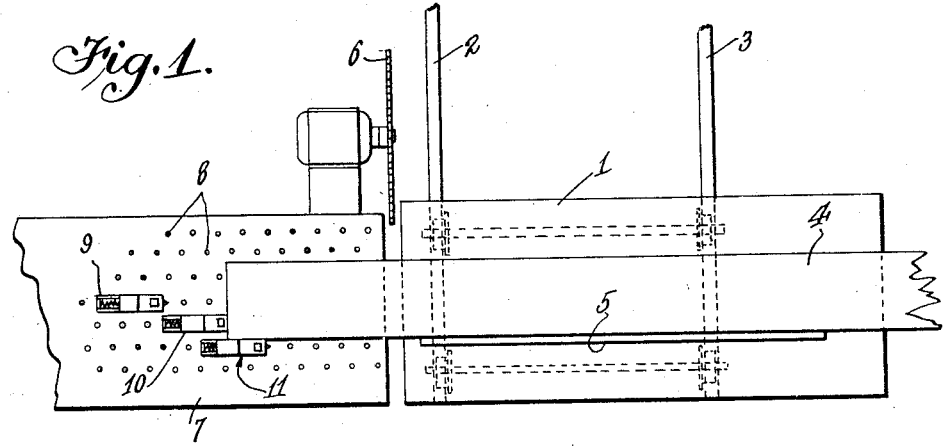
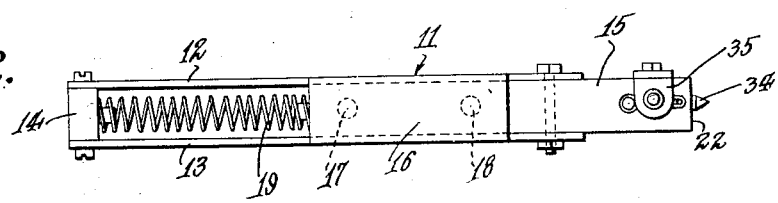
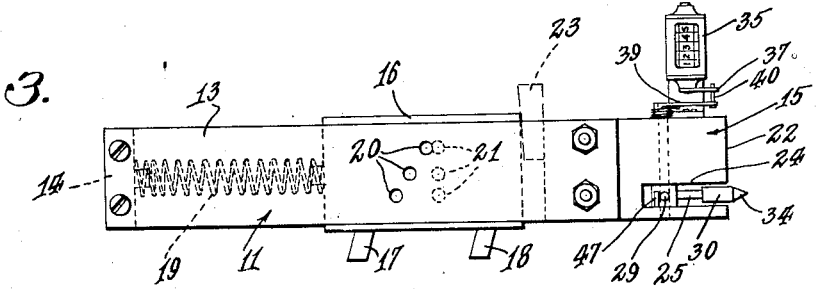
Inventor
Edwin J. Grant
By Lyon & Lyon
Attorneys Nov. 20, 1934.  E. J. GRANT  1,981,231
REGISTERING STOP DEVICE
Filed Oct. 12, 1931  2 Sheets-Sheet 2
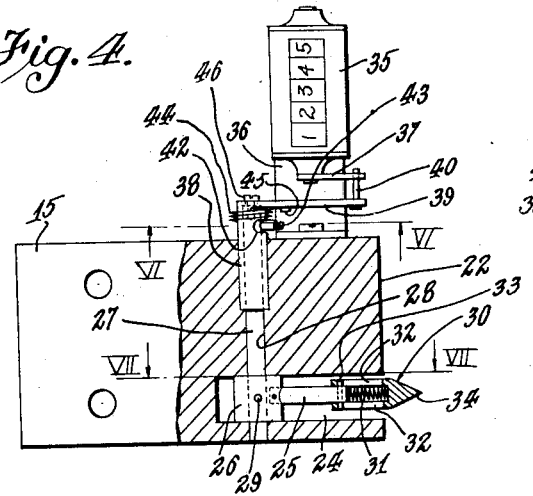
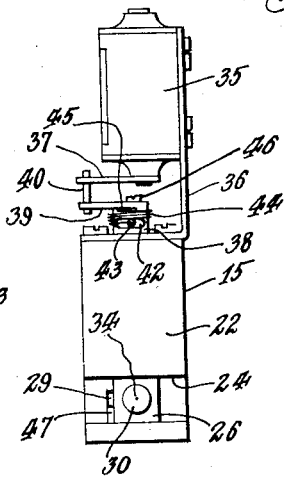
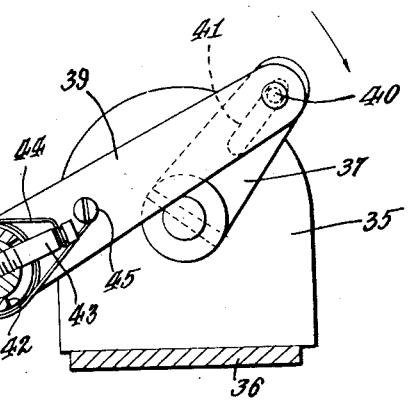
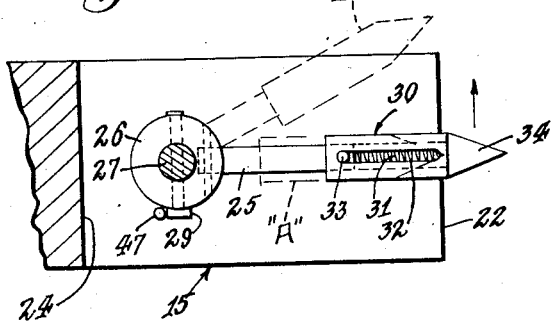
Inventor
Edwin J. Grant
By Lyon & Lyon
Attorneys Patented Nov. 20, 1934

1,981,231

UNITED STATES PATENT OFFICE 1,981,231

REGISTERING STOP DEVICE

Edwin J. Grant, Los Angeles, Calif.

Application October 12, 1931, Serial No. 568,489

5 Claims. (Cl. 235—91)

This invention relates to a stop device for gaging the size of lumber or other materials which it is desired to saw, cut or stamp. More particularly, the invention relates to a stop device which registers or counts the number of pieces of lumber or other material which have been cut, sawed or stamped while using such stop. Although the preferred embodiment of the invention described in detail hereinafter relates most particularly to the application of the stop device, cut-off tables and trimming saws used in the lumber industry, it is to be understood that the apparatus is capable of being advantageously used in stamping, punching, shearing or cutting machines operated not only on lumber but also on various other materials, compositions and/or metals.

In the lumber industry, when cutting up long boards into shorter pieces of a desired length, such as for example in cutting box shooks, it is not desirable to cut the lumber through a knot. When the operator brings the end of his lumber into abutting relation with the preferred stop on his stop table and observes that the line of cut will pass through a knot, he moves the lumber into abutting relation with another stop and then moves the carriage and the lumber supported thereby into operative relation with the cut-off saw. The device of this invention registers the number of actual cuts made while using each stop and furthermore marks the lumber with a characteristic symbol, permitting subsequent identification of the machine and its operator.

When the operator of a cut-off or trimming machine is paid in accordance with the number of pieces of preferred length that he cuts from the lumber supplied to him, then it becomes necessary to keep accurate check on the operation. The stop device should not register every time a piece of lumber is brought into abutting relation with the stop but instead should only register when the lumber is moved from the stop into cutting relation with the saw.

The stop device of this invention not only performs the function of an ordinary stop, but in addition counts or registers the number of pieces of lumber actually cut while employing such stop. The device is simple and fool-proof and unaffected by repeated blows or contacts with the end of a board unless such board, after being contacted with the stop, is moved in a direction paralleling the plane of the stop face into cutting relation with a saw.

An object of this invention, therefore, is to provide a simple and effective form of stop device which will automatically count the number of pieces of material cut, stamped or otherwise treated while using such stop.

Another object of this invention is to provide a stop device of simple and effective construction by means of which a positive register or count of the number of pieces of material cut while using such stop, may be obtained.

A still further object of this invention is to provide a registering or counting stop device which will be unaffected by accidental blows or by the act of bringing material to be cut into abutting relation with the stop.

A still further object of this invention is to disclose and provide an automatically registering stop which will form an identifying mark upon the lumber while using such stop.

These and other objects, uses and advantages of this invention will become apparent to those skilled in the art from the following detailed description of one embodiment of the invention. It is to be understood that the device shown on the appended drawings is merely illustrative of one form of the invention and of one use thereof and that numerous changes and modifications could be made in the structure by means of which it could be adapted for other uses than the one specifically described.

In describing the illustrative embodiment of this invention, reference will be had to the appended drawings, in which Fig. 1 is a diagrammatic representation of a cutting-off table as used in the lumber industry.

Fig. 2 is an enlarged plan view of one of the stop devices shown in the stop table of Fig. 1.

Fig. 3 is a side elevation of the device shown in Fig. 2.

Fig. 4 is an enlarged side elevation, partly broken away, of the head of the stop shown in Figs. 2 and 3.

Fig. 5 is an enlarged front elevation of the head shown in Fig. 4.

Fig. 6 is a horizontal section taken along the plane 6—6 of Fig. 4.

Fig. 7 is a horizontal section taken along the plane 7—7 of Fig. 4.

Fig. 8 is a side elevation and a front elevation of a modified form of nose piece.

As shown in Fig. 1, a carriage 1 movable along guide rails 2 and 3 receives lumber 4, said lumber being placed against an edge member 5 at right angles to the cutting plane of a saw 6. Adjacent to the traveling carriage 1 is a stop table 7 provided with a plurality of apertures 8 adapted to receive and hold stops 9 and 10. These stops 9 and 10 are preferably made in accordance with the subsequent detailed description.

The faces of the stops lie in planes paralleling the cutting plane of the saw 6. The distance between the face of the stop and the cutting plane of the saw 6 determines the length to which the lumber will be cut. If, for example, 10 represents the preferred length of the lumber and 9 and 11 are stops of less desirable size, then the operator will place the piece of lumber 4 into abutting relation with the face of the stop 10 and will move the carriage 1, together with the lumber supported thereby, into cutting relation with the saw 6 but if after placing into abutting relation with the stop 10 the operator observes that a knot is situated in the lumber in alignment with the cutting plane of the saw 6, he will move the lumber into abutting relation with stop 9 or stop 11 so as to cause the cutting plane to miss the knot.

As has been stated hereinbefore, the stop device of this invention is adapted to form a mechanical register of the number of pieces of lumber cut while employing each stop. The mere act of bringing the end of the lumber into abutting relation with the stop should not cause said stop to register as very often the operator will remove the board from abutting relation with the stop and instead use another stop in actually cutting the lumber.

One form of the registering stop embodying this invention is shown in Figs. 2 to 7. As shown in Figs. 2 and 3, the stop may consist of a carriage consisting of side plates 12 and 13 held together at one end by a spacing member 14 and holding a head 15 at the other end. The carriage is preferably adjustably mounted in a holder 16 provided with grooved sides adapted to receive the members 12 and 13. The holder 16 may be provided with downwardly extending pins 17 and 18 adapted to be inserted into suitable apertures 8 of the stop table 7. A spring 19 may be carried between the member 14 and the body of the holder 16 so as to maintain the head 15 in contact with the holder 16. Means may be provided for adjustably positioning the carriage upon the holder, such means, for example, consisting of a plurality of apertures 20 made in the side members 12 and 13 of the carriage and apertures 21 extending through the body of the holder 16. The apertures 20 and 21 are staggered relatively to each other so that the face 22 of the head 15 may be fractionally advanced by sliding the carriage on the holder and inserting a pin through the apertures 20 and 21. Or a suitable wedge 23 may be inserted between the head 15 and the holder 16, as shown in Fig. 3.

The face 22 of the head 15 preferably lies in a plane parallel to the plane of the cutting saw. The head 15 is preferably provided with a horizontal slot 24 extending rearwardly from the face 22. The arm 25 is pivotally mounted to move within the slot 24. For example, the arm 25 may be connected to a collar 26 carried on a pin 27 extending through a vertical bore 28 made in the head 15. The collar 26 may be attached to the shaft 27 by means of a pin 29.

The arm 25 may be provided with a nose piece 30 slidably carried upon said arm. Means may be provided for yieldably urging said nose piece 30 outwardly on said arm beyond the plane of the face 22. Such means may comprise a spring 31 mounted in the hollow body portion of the nose piece 30 and bearing against the end of the arm 25. Longitudinal slots 32 may be formed in the nose piece member 30 and the end of the arm 25 may carry a pin 33 cooperating with said slots. In this manner, the nose piece 30 is prevented from rotating upon the arm 25 but may be moved along said arm towards the shaft 27. Preferably, the nose piece 30 is provided with a pointed end 34.

The head 15 preferably carries a counting device 35 supported by means of the angle 36. The counting device 35 is provided with a slotted arm 37, said slotted arm being connected to the shaft of the counting device 35.

An operable connection is made between the arm 25 pivotally mounted within the horizontal slot 24, and the slotted arm 37 of the counting device 35. For example, such connecting means may comprise a sleeve 38 mounted upon the upper end of the shaft 27, said sleeve 38 being provided with an arm 39 bearing a pin 40 adapted to cooperate with the slot 41 of the arm 37. The sleeve 38 may be directly connected to the shaft 27 or instead the connection between the sleeve 38 and the shaft 27 may be yielding in character. For example, the sleeve 38 may be provided with an aperture 42 and the shaft 27 may be provided with a pin 43 extending through such aperture 42. A coil spring 44 may then have one end thereof connected to the pin 43 and the other end connected to the arm 39, as indicated at 45. The sleeve 38 may be kept in contact with the shaft 27 by means of a machine screw 46 extending into the top of the shaft 27, as shown in Fig. 4.

The position of the aperture 42 and of the pin 43 extending therethrough and the tension of the spring 44 are preferably so adjusted that under normal conditions the arm 25 and the nose piece 30 lie in a plane at right angles to the face 22 of the head 15, in other words, in the position shown in Fig. 7. When a piece of lumber is brought into abutting relation with the face 22 of the stop, the nose member 30 is moved back along the arm 25 to a position indicated in dotted lines at A.

If, thereafter, the lumber is moved into the cutting plane of the saw and in the direction of the arrow appearing in Fig. 7, the arm 25 will be caused to pivot from position A to position B, thereby causing shaft 27 to partially revolve. This partial rotation of the shaft 27 is transmitted to arm 39 and slotted arm 37, causing the counter 35 to be actuated. It is to be understood that the nose piece 30 is maintained in contact with the end of the lumber during this operation by reason of the spring 31 carried by said nose piece.

When the end of the nose piece 30 is in the form of a sharp cone 34, as indicated in Figs. 4, 5 and 7, a single dot or depression is made in the end of the lumber. The nose piece 30 may terminate in a horizontally, vertically or angularly directed wedge, thereby marking the end of the lumber with a horizontally, vertically or angularly directed line. It is to be understood that this nose piece may assume a number of different forms, it being desirable, however, that the nose piece be sufficiently sharp so as to partially enter the end of the lumber or other material brought into abutting relation with the face 22 of the stop. The position and form of the nose piece determines the character of the mark left in the lumber and in this manner, it is possible to determine what machine or what operator cut any particular piece of lumber on which these devices are used.

Illustrating one of the various forms which may be assumed by the nose piece 30, reference is made to Fig. 8 wherein the nose piece 30' is seen to terminate in two separated points 34' and 34".

In order to assure the return of the arm 25 to the position indicated in Fig. 7, a suitable stop may be provided. For example, a pin 47 may be positioned in the slot 24 adjacent to the collar 26 in such manner as to abut the head of the pin 29, thus causing the arm 25 to come to rest when it is substantially at right angles to the plane of the face 22.

By having the spring-like coupling between the shaft 27 and the arm 39, the arm 25 and shaft 27 may rotate from a greater arc than the arm 39, thus removing any strain from the arm 37 of the counting mechanism 35.

It will be obvious to those skilled in the art that a stop of the character described hereinabove will not register unless lumber or other material to be cut is brought into abutting relation with the face 22 and such lumber then moved in a direction paralleling the face 22. The operator of a trimming mechanism or cut-off saw can therefore bring his lumber in contact with stops equipped with the registering head described hereinabove, without causing such head to register unless such lumber is actually moved into cutting position.

Furthermore, it will be obvious to those skilled in the art that the arrangement of elements described hereinabove may be materially varied without departing from the spirit of this invention, and all such changes and modifications as come within the scope of the appended claims are embraced thereby.

I claim:

1. A stop device of the character described comprising a holder, a carriage adjustably carried by said holder, a head piece provided with a vertical face and a horizontal slot carried by said carriage, an arm pivotally mounted in said slot, a nose piece slidably carried by said arm, means for yieldably urging said nose piece outwardly on said arm and beyond the plane of said face, a counter carried by said head, and means operably connecting said arm with said counter.

2. A stop device of the character described comprising a head piece provided with a vertical face and a horizontal slot, a vertical shaft journaled in said head and extending into said slot, an arm mounted on said shaft in said slot, a nose piece slidably carried by said arm, means for yieldably urging said nose piece outwardly on said arm and beyond the plane of said face, a registering means carried by said head, and means operably connecting said shaft with said registering means whereby partial rotation of said arm and shaft is adapted to actuate said registering means.

3. A counting device of the character described including a stop member, a counter carried by the stop member, and an arm pivotally carried by the stop member and operably connected to said counter, said arm being provided with an end portion longitudinally movable on said arm and adapted to yieldably project beyond said stop member.

4. A counting device of the character described including a stop member, a counter carried by the stop member, an arm pivotally connected to the stop member and adapted to partially rotate on said pivotal connection, spring means for yieldably urging said arm into a predetermined position on its pivotal connection, means operatively connecting said arm and counter whereby said counter is actuated by pivotal movement of said arm, and an end portion carried by said arm and longitudinally movable thereon, adapted to yieldably project beyond said stop member when in said predetermined position.

5. A counting device of the character described including a stop member provided with a face, an arm pivotally connected to said stop member, said arm normally extending at right angles to the plane of the stop face, a slidable and yieldable nose piece on the free end of said arm and normally projecting beyond the face of the stop member, a counter carried by the stop member, and means operably connecting said counter with said arm whereby pivotal motion of said arm actuates said counter.

EDWIN J. GRANT.